United States Patent Office 3,229,488
Patented Jan. 18, 1966

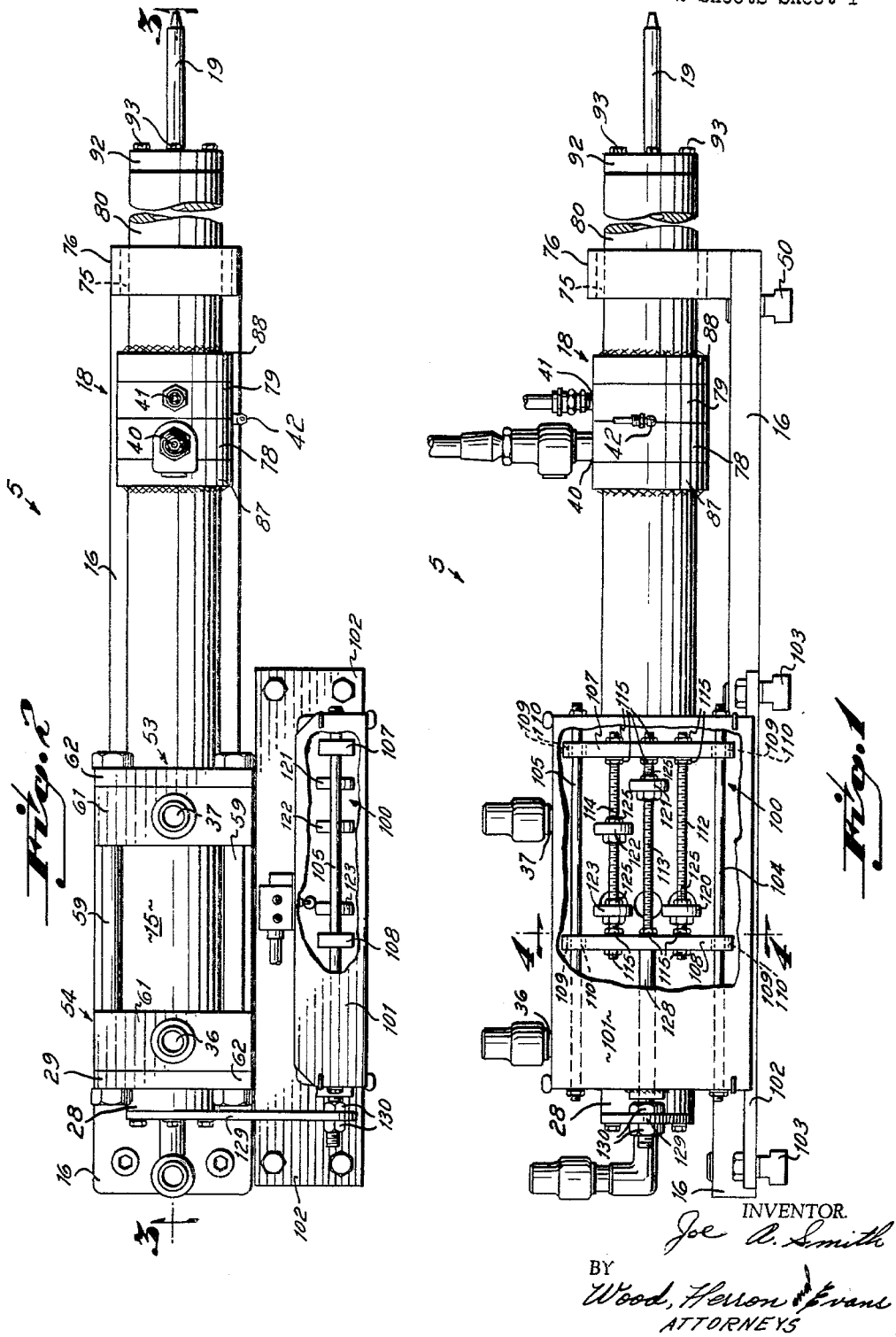

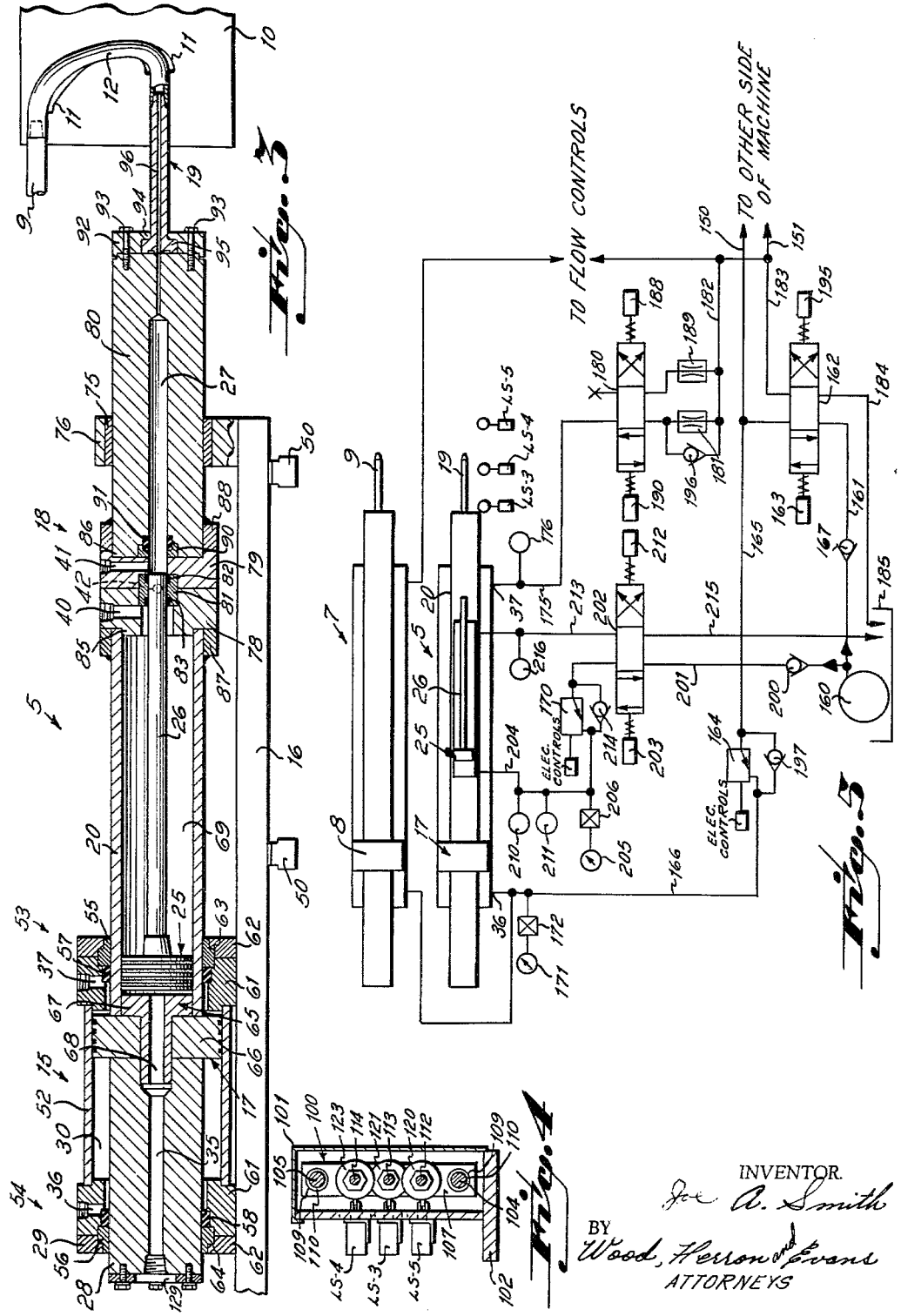

3,229,488
APPARATUS FOR SHAPING HOLLOW OBJECTS
Joe A. Smith, Louisville, Ky., assignor to American Radiator and Standard Sanitary Corp., New York, N.Y., a corporation of Delaware
Filed Oct. 18, 1962, Ser. No. 231,338
7 Claims. (Cl. 72—58)

This invention relates to hydraulic forming machines and more particularly to an improved hydraulic system for controlling these machines.

Hydraulic forming machines are used for producing diverse hollow articles of regular or irregular shape from metal tubing. This is accomplished by placing the tubular work blank within a contoured mold cavity and forcing the blank to accept the contour of the cavity by hydraulic pressure means.

There are two different methods of using this type of apparatus for shaping hollow articles. One is illustrated in Garvin Patent No. 2,902,962. As shown in this patent, the workpiece blank is shaped by two hydraulic cylinders, a bulging and a feeding cylinder, each having a piston therein and arranged in an axial alignment with the feeding cylinder nearest the die. Upon application of hydraulic pressure to the feeding cylinder, the end of its piston engages with and seats upon the end of the tubular workpiece to form a seal therewith. Subsequently, the bulging cylinder is actuated to apply hydraulic pressure to the interior of the workpiece and thus cause it to expand and accept the contour of the mold cavity. As the bulging pressure increases to expand the workpiece, a higher hydraulic pressure is applied to the feeding cylinder to force the workpiece inwardly into the die cavity thereby to counteract the reduction of wall thickness which otherwise attends bulging of the workpiece. Thus, according to this patent, feeding and bulging occur substantially simultaneously.

The other basic method for utilizing hydraulic forming machines to expand a workpiece is disclosed in the application of Harvey Landis Serial No. 811,941, filed May 8, 1959, now Patent No. 3,072,085 for "Method and Apparatus for Producing Hollow Articles." As shown in this application, feeding pressure alone causes a workpiece to achieve an expanded form, providing pressure corresponding generally to that at which the metal of the workpiece will yield is maintained at its interior. This application embodies the same in-line cylinder and piston arrangement as that shown in the Garvin patent. However, in this application, a pressure corresponding to that at which the workpiece will or has just begun to bulge, called the yield point pressure, is established at the workpiece interior by the bulging cylinder but the pressure is deliberately controlled not to actually or substantially bulge the workpiece. While this pressure is maintained, the feed cylinder is actuated and metal is mechanically pushed into the die cavity. As it does so, the tubular walls of the blank follow the walls of the die cavity and the workpiece assumes a shape generally corresponding thereto except at the corner areas or crevices. The internal pressure in this instance principally resists internal collapse of the walls of the workpiece during the period while its actual strength is very low, that is, while it is maintained at an internal pressure corresponding to or just exceeding the yield point of the metal. In this type of expansion, the metal does not conform to all the intricacies of detail of the die cavity but final configuration readily is imparted by a "coining" operation wherein high pressure is exerted at the interior from the bulging cylinder to drive the metal into the cavities while the metal generally is sustained against bursting by the die.

It has been an objective of this invention to provide an improved hydraulic feeding and bulging cylinder arrangement for use with equipment operable to expand tubular workpieces according to either of the methods outlined above. To this end, the improved aparatus of this invention is operable selectively to perform either the simultaneous bulging and feeding operation as disclosed in Garvin Patent No. 2,902,962 or the bulging by feeding operation as disclosed in Landis application Serial No. 811,841.

Another objective of this invention has been to provide a simplified and inexpensive unitary compound cylinder arrangement as distinguished from separate in-line bulging and feeding cylinders for accomplishing the bulging and feeding operations.

Yet another objective of this invention has been to provide a feeding and bulging cylinder arrangement which permits which higher bulging and coining pressures to be applied to the workpiece than was formerly possible in hydraulic forming machines. One of the problems encountered in utilizing machines as illustrated in the above mentioned Garvin patent is that of maintaining alignment of the two cylinders under the very high forces to which the apparatus is subjected intermittently. At high pressures there is a tendency in machines of this type for one cylinder to shift relative to the other resulting in excessive wear of the piston and cylinder parts and in leakage. The unitary construction of this invention minimizes alignment problems and thus permits much higher pressures to be utilized in the machine. Additionally wear and and fluid leakage are substantially reduced with this improved construction.

Another objective of the invention has been to provide an improved hydraulic motor system for use in a machine for hydraulically forming hollow workpieces in which the workpiece feeding motor operates independently of the pressure intensifier motor so that a pressure change in one does not influence or alter the pressure in the other. To this end, the pressure intensifier motor of this invention has been mounted within the piston of the feeding motor so that an increase in pressure of the intensifier motor does not tend to force the feed piston forward into the workpiece and alternatively, an increase of pressure in the feed motor does not tend to cause a decrease of pressure in the intensifier motor as was the case in former motor assemblies wherein each motor was mounted independently of the other. An advantage of this construction is the much closer control obtainable over the workpiece forming process and consequent improved workpieces.

These and other objects and advantages of the invention will be more apparent from a description of the drawings in which:

FIGURE 1 is a side elevation partially broken away of the hydraulic piston and cylinder arrangement of this invention, FIGURE 2 is a top plan view partially broken away of the piston and cylinder arrangement of FIGURE 1, FIGURE 3 is a cross sectional view taken along the line 3—3 of FIGURE 2, FIGURE 4 is a cross sectional view taken along lines 4—4 of FIGURE 1, FIGURE 5 is a diagrammatic view of the hydraulic circuit used in conjunction with the piston and cylinder arrangement of this invention.

The main portions of the machine illustrated in the drawings consists of a die set 10 having a configurated cavity 11 therein. The die set consists of two mating portions which are adapted to be opened and closed to facilitate production of workpieces. In the illustrated embodiment and by way of example, the workpiece consists of a water faucet spout 12 although it should be understood that the die cavity may be of any desired configuration. Apparatus for opening and closing the die set is conventional and suitable apparatus for this purpose is illustrated in the aforementioned Garvin patent.

The tubular workpiece located in the die is forced into the configuration of the die cavity by means of a hydraulic motor system illustrated in FIGURES 1, 2 and 3. The hydraulic control circuit for controlling this motor system is illustrated in FIGURE 5 and will be described hereinafter.

As seen in FIGURE 3, the illustrated embodiment of the hydraulic motor system consists of a main cylinder or sealing and feeding cylinder 15 mounted upon a base 16. Within the main cylinder 15 is disposed a piston 17 of substantial diameter. This piston 17 projects forwardly of the main cylinder and carries a rod section 20 which terminates in a sealing mandrel 19 adapted to engage and seat upon the end of a workpiece. The rod section 20 of the main cylinder 15 has an axial bore therein within which is mounted a second or pressure intensifier piston 25. The pressure intensifier piston rod 26 extends forwardly and telescopically into a bore 27 in a port block 18. The piston 17 of the main cylinder 15, at the end opposite its piston rod 20, carries a tail piece 28 which rides through an end wall 29 of the main cylinder and within a fluid supply chamber 30. The tail piece or port member 28 is bored axially 35 so that fluid may be supplied through the tail piece 28 for actuation of the pressure intensifier piston 25. The sealing and feeding cylinder 15 is provided with an oil inlet port 36 for admitting hydraulic fluid to feed the sealing cylinder forward and an oil outlet port 37 through which fluid is evacuated during the forward feed of the sealing cylinder and into which fluid is fed when the sealing cylinder is returned or moved away from the workpiece. The port block 18 in turn has three ports, one of which 40 evacuates hydraulic fluid from the forward side of the hydraulic piston intensifier 25 as the pressure intensifier piston is moved forwardly. When the pressure intensifier piston is moved rearwardly oil is inserted through this port. The two remaining ports 41, 42 of the port block 18 are water inlet and drain ports respectively. Water is inserted through port 41 into the axial bore 27 in the port block at a point which is located just ahead of the pressure intensifier piston rod 26 when it is in its retracted position. This port is employed for admitting flushing and filling fluid to the workpiece as the workpiece is engaged by the nozzle portion 19 of the port block. The drain port 42 is open to the atmosphere and merely serves to prevent inadvertent mixing of the water and hydraulic fluid.

From this description it will be seen that the hydraulic power system of this invention is a unitary assembly, the main piston 17 of which is carried in the sealing and feeding cylinder 15 fastened to the bed of the machine and the pressure intensifier piston 25 is carried within the piston rod 20 of the main piston 17 such that it is axially movable therewith or independently thereof. The possibilities of transverse movement of the secondary piston relative to the primary are minimized by this arrangement so that very high pressures as in coining do not cause serious misalignment of one cylinder laterally in relation to another.

In this unitary construction, the main or sealing cylinder piston 17 acts to seal the workpiece and feed the workpiece into the die and the secondary piston 25 with the intensifier piston rod 26 acting as a pressure intensifier. Filling and flushing fluid enter the workpiece through the water input port 41 in the port block and that port 41 is closed off by the piston rod 26 of the pressure intensifier to trap fluid within the workpiece.

For details of the hydraulic motor system, attention is directed to FIGURE 3. As may be clearly seen in that figure, the main or sealing and feeding cylinder 15 is rigidly and fixedly mounted upon the base plate 16. This plate 16 is in turn equipped with depending T-shaped lugs 50 adapted to be mounted in T-slots on the bed of the hydraulic forming machine.

Main cylinder 15 consists of a cylindrical sleeve 52 secured between two end assemblies 53, 54. Each of these assemblies 53, 54 is constructed from two substantially square plates 61, 62 in abutting relationship. Each pair of plates forms an internally stepped recess 63, 64 within which a bushing 55, 56 and sealing ring 57, 58 is seated and securely held in position. Tail piece 28 on piston 17 extends through and is slideable within bushing 56 while piston rod 20 of the main piston 17 rides within bushing 55. The main cylinder 15 is held in assembled relationship by a plurality of bolts 59 which extend axially through the end plate assemblies 53, 54, and is secured upon the base plate 16 by means of bolts (not shown) extending upwardly through the base plate into the end plates 61—61 of the cylinder.

In order to accommodate the intensifier piston 25 and the fluid porting necessary to move the intensifier piston 25 within the main piston rod 20, main piston 17 is made from a plurality of parts or elements. These elements consist of an axially extending port member 65 over the rearwardly extending end of which the piston block 66 and tail piece 28 are telescopically assembled. At the forward end, the port member 65 has an enlarged flange section 67 upon which the sleeve like piston rod 20 is mounted. A bore 68 extends axially through the port member 65 and communicates with the bore 35 in the tail piece 28 and with the fluid chamber 69 of piston rod 20 so that fluid fed through the tail piece will cause the pressure intensifier piston 25 to move forwardly.

The forward end of the piston rod has the port block 18 mounted thereon so that it is axially movable with the rod. The forward end or intensifier chamber portion 80 of the port block 18 extends through a guide bushing 75 mounted within an upwardly extending portion 76 of the base plate 16. At the rear end, the block 18 includes two annular plates 78, 79 through which pass the oil outlet 40 and the water inlet 14 and drain 42. To prevent water inserted through port 41 from entering the oil supplied through port 40, a bushing 81 is located in a groove defined by the internal surface of the two plates. The bushing accommodates the piston rod 26 of the intensifier piston 25 and has a pair of seals 82, 83 mounted therein and engageable with the piston rod 26. The annular plate 78 has a circular protrusion 85 upon its rearward face over which the main piston rod 20 is fitted and the plate 79 has an annular recess 86 in its forward face into which the guide block 80 is mounted. Annular plates 78 and 79 are held in assembled relationship with the piston rod 20 and the guide block 80 by means of a plurality of bolts going through a pair of annular rings 87, 88 welded to the piston rod 20 and the intensifier chamber 80 respectively. At its rearward end the intensifier chamber 80 has a bushing 90 and sealing rings 91 mounted therein. The bushing 90 acts as a guide and bearing surface for the piston rod 26 as it is moved forwardly within the bore 27 in the guide block. At the forward end, intensifier chamber 80 has an annular ring 92 attached by means of a plurality of screws 93. Ring 92 has an inwardly extending lip 94 which is received over a flanged portion 95 of the sealing mandrel 19 to securely hold the sealing mandrel 19 in fixed position relative to the guide block 80 and the main piston rod 20.

The water inlet port 41 communicates with the axial bore 27 of the guide rod and a bore 96 through the sealing mandrel so that fluid may be fed through the port 41 and sealing mandrel to flush air and entrapped debris through the die block as the mandrel moves forward the seal off the ends of the workpiece prior to the forming. After the sealing mandrel has engaged the end of the workpiece, the intensifier piston 25 is moved forwardly to shut off the port 41 and force the fluid entrapped in the bore 27 through the sealing mandrel 19 into the interior of the workpiece so as to force the workpiece into engagement with the contoured die block cavity.

For purposes of controlling movement of the main piston, a control slide upon which a plurality of stop abutments are mounted is movable with the main or sealing and feeding piston 17. As may be seen in FIGURES 1, 2 and 4 the feed slide 100 is mounted within a cover guard 101 attached to a base plate 102 mounted upon the bed of the machine by T-bolts 103. A pair of slide guide rods 104, 105 extend between the forward and rearward sides of the guard plate and support the control slide 100 for movement along the rods. The control slide consists of two end plates 107, 108 having aligned apertures 109 adjacent their upper and lower edges through which the guide rods 104, 105 pass. To minimize friction, each of the apertures 109 has a bushing 110 mounted therein.

Extending between the end plates 107, 108 are three threaded screws 112, 113, 114 each of which is held in fixed position relative to the end plates 107, 108 by means of bolts 115. Adjustable stop abutments 120, 121 are mounted upon the screws 112, 113 respectively. The screw 114 has two adjustably mounted stop abutments 122 and 123 thereon. Each of the stop abutments is held in a fixed adjusted position by means of lock nuts 125.

Attached to the end plate 108 and extending outwardly through the guard 101 is a slide actuating bar 128. This bar is attached to a plate 129 mounted on the tail piece 28 of main piston 15. The actuating bar 128 is secured to plate 129 by a pair of lock nuts 130 so that control slide 100 is moved simultaneously with and parallel to the sealing and feeding piston 17.

As may be seen in FIGURE 4, three limit switches LS-3, LS-4, LS-5 are attached to and extend through the back of the guard 100 in a position to be engaged by the stop abutments on the screws 114, 113 and 112 respectively. As will be explained more fully hereinafter, these limit switches control valves in the hydraulic system and thus cooperate with the abutments on the slide to act as a programming medium for the hydraulic motor system.

Referring to FIGURE 5, there is shown a diagrammatic illustration of the hydraulic motor and control systems. As shown in this diagrammatic illustration, a second hydraulic motor system 7 may be used at one end of the workpiece in addition to the motor system 5. Hydraulic motor system 7 may be identical to the motor system 5, but for many purposes, a sealing function is all that is required at one end of the workpiece. Therefore in this embodiment, motor system 7 merely comprises a single piston 8 for driving a sealing mandrel 9 into engagement with the end of the workpiece. Sealing mandrel 9, unlike mandrel 19, is solid and functions only to seal the workpiece and to feed the material inwardly.

The hydraulic circuit includes a pump 160 for supplying oil or other hydraulic fluid to the main cylinders and the pressure intensifier pistons. Considering first the circuit to the sealing and feeding cylinders, the oil from the pump unit 160 passes through a check valve 167 which is used to prevent a pressure loss in the sealing circuit if the main system pressure suddenly drops. From the check valve 167 the oil pases via line 161 to a conventional four-way directional valve 162. When a solenoid 163 is energized, by means of a conventional cycle starting circuit (not shown), the oil passes through the four-way valve 162 to a commercially available electric pressure reducing valve 164 via line 165. This valve 164 reduces the pressure to an initial setting (for example, approximately 150 to 200 p.s.i.) which when fed to the rear of the main pistons 8 and 17 via line 166 is just sufficient to positively move the cylinders forward when there is no signal applied to the electronically controlled valve 164. The line 166 is equipped with a pressure gauge 171 which is used to measure the pressure in line 166 during initial set up of the machine. A needle valve 172 is operable between the gauge 171 and line 166 to close off fluid flow from line 166 to the gauge and render the gauge inoperative if so desired.

The electrically controlled pressure reducing valve 164 is identical to valve 170 in the pressure intensifier circuit. These valves are commercially available from the American Brake Shoe Company. They are operable to control the rate of pressure build-up and drop-off in hydraulic circuits and provide a simple method of changing pressures to different values, as needed. In operation, the valves utilize a variable voltage signal on a solenoid winding to increase or decrease the force on a spool of the valve. The force on the spool controls the value of the pressure in the circuit.

Each of the commercially available valves is equipped with an electrical control unit operable to supply the voltages necessary to cause the valves to adjust to the pressure desired in the circuit. The electrical control units each are equipped with a plurality of dials operable to adjust:

(1) The initial valve pressure (the pressure when no electrical signal is applied to the control unit).

(2) The first valve pressure (the pressure supplied by the valve when a first of three switches in the control unit is closed).

(3) The rate of build-up from the initial pressure to the first pressure.

(4) The second valve pressure (the pressure supplied when a second switch in the control unit is closed).

(5) The rate of build-up from the first valve pressure to the second pressure.

(6) The rate of drop-off of valve pressure from the second pressure to the initial pressure when a third switch is closed.

When the feed cylinders have moved forwardly to a position in which the sealing mandrels 9, 19 are within the die but approximately ¼" from the end of the workpiece, stop abutment 122 engages limit switch LS-4 to cause a first electrical signal to be applied to the electronic valve 164. Since the electronic circuitry for controlling the valves and solenoids illustrated in the drawings forms no part of the invention and is conventional control circuitry which could easily be supplied by one skilled in the art, it has been omitted from the drawings for purposes of clarity.

When the first electrical signal is applied to the valve 164 it causes the pressure to rise to a pre-set value in a pre-set time to seal the ends of the tubing. By way of example, this pressure may be approximately 200 to 400 p.s.i. occuring in approximately one second. This value represents the sealing pressure applied on the ends of the tubing.

The closing of switch LS-4 is also operative to actuate a solenoid operated valve (not shown) which opens the water line to port 41. The water passes through the sealing mandrel 19 and fills the workpiece tubing. A valve and circuitry to control water flow is illustrated in the aforementioned Garvin patent.

When the sealing mandrels engage the workpiece, a pressure drop occurs in the main cylinder fluid outlet line 175. This drop is sensed by a pressure switch 176 which closes to send an electrical signal to the electrically controlled valve 170 of the pressure intensifier circuit. This causes the pressure in a line 204 of the pressure intensifier circuit to be built up to the bulging pressure as is more fully explained hereinafter in connection with the description of the pressure intensifier circuit. When the bulging pressure is attained, a pressure switch 210 in line 204 closes and sends a second signal to the control circuit of valve 164 which raises the pressure in line 166 to a higher pre-set value, as for example 2500 p.s.i. This is the pressure applied to the end of the mandrel to feed the workpiece into the die as the part is being formed.

After the workpiece has been fed completely into the die, feed stop abutment 120 engages limit switch LS-5 to close the switch. The closing of this switch acts upon the pressure intensifier circuit to cause the water pressure in the workpiece to be increased to "coining" pressure as is more fully explained hereinafter. After the "coining" pressure is reached in the pressure intensifier circuit, a third signal is sent from the intensifier circuit to the third switch of the electrical control associated with valve 163. The closing of this third switch of the electrical control valve 164 causes the pressure in line 166 to drop off to the initial pressure setting of the valve at a rate determined by the setting of the dial of the electrical control of valve 164, as for example from 2500 p.s.i. to 100 p.s.i. in two seconds.

From the forward outlet 37 of the main cylinder 15, the oil passes through line 175 to a four-way directional valve 180, which is used to select the cylinder speed, fast or slow. For fast feed of the main cylinder from its rear position to the position in which the stop abutment engages the limit switch LS-4 (the position in which the water flow is started to port 41), the oil in line 175 passes through the valve 180 upon energization of solenoid 190. This solenoid is energized at the start of the operative machine cycle by the manual start switch (not shown). In this position, valve 180 directs the oil through a restricted orifice or valve 181 and hence through lines 182, 183, valve 162 and line 184 to the storage tank 185. The rate of flow of fluid from the forward side of the main piston 17 is determined by the restricted orifice 181 which in turn controls the rate of movement of the main piston. When the switch LS-4 is closed, solenoid 188 of valve 180 is energized to direct the oil flow from line 175 through valve 180 to the more restricted orifice or valve 189 and hence back to tank 185. So long as solenoid 188 is energized, main piston 17 moves forwardly at a slow rate of feed until it is stopped by the resistance of the workpiece.

Valve 180 is also used as a stop to prevent the seal motor from feeding too far. When the seal motor has fed the proper amount and the workpiece has been forced all the way into the die, limit switch LS-5 is engaged and closed by abutment 120. Closing of the switch LS-5 de-energizes solenoid 188 of valve 180 which causes valve 180 to be moved to a centered position in which no flow is permitted through this valve and thus the main piston is prevented from moving. Limit switch LS-4 acting through appropriate circuitry (not shown) is also operable to move valve 180 to a centered position when engaged by the safety stop abutment 123.

To retract the main cyliders, soledoid 195 is energized by a signal from the pressure intensifier circuit as is more fully explained hereinafter, allowing oil from line 161 to flow through valve 162, lines 183, 182, a one way check valve 196 and continue through valve 180 to the forward port 37 of the main cylinder. Oil from the rear port of the cylinder passes through line 166, a one-way check valve 197 which is connected in parallel around the electronically controlled valve 164, to valve 162 and back to the reserve tank 185.

It should be noted that each hydraulic forming machine may be equipped with one or more dies and for that reason hydraulic lines 150, 151 are provided to supply fluid to an identical hydraulic circuit to operate appropriate cylinders when another die is located on the machine. If so desired, the duplicate may be set for different pressures so as to permit differently configurated workpieces to be made simultaneously in the machine.

The remaining portion of the hydraulic control circuit is utilized in conjunction with the pressure intensifier piston. Oil is supplied to the pressure intensifier circuit from the pump unit 160 from which it passes through a check valve 200 which serves to prevent sudden pressure losses in the intensifier circuit in the event of a sudden pressure drop in the main circuit. From check valve 200 the oil continues via line 201 to a four-way directional valve 202. When solenoid 203 of valve 202 is energized, by a signal from pressure switch 176 indicating that the mandrel is seated against the workpiece, oil is permitted to flow through valve 202 to the electronically controlled pressure reducing valve 170 and hence to the rear of pressure intensifying piston 25 via line 204. Connected to line 204 is a pressure gauge 205 and needle valve 206 which are used during initial machine set-up in a manner similar to gauge 171 and needle valve 172. The oil passing to the rear of the pressure intensifying piston 25 is built up to a preset value in valve 170, as for example 300 p.s.i. This pressure is sufficient to cause the piston 25 to move forward and pass over the water inlet port 41. After the water inlet port is blocked, the intensifier piston rod 26 acts as a piston to force the entrapped water in the bore 27 into the workpiece. The pressure acting to force the intensifier piston 25 in the forward direction is compounded when applied to the much smaller area of the intensifier piston rod 26 and thus the pressure of the water in the bore 27 is built up to a relatively high value. It is this pressure which causes the tubing to bulge or start to bulge depending upon the pressure selected. When the pressure behind piston 25 reaches workpiece "bulging" pressure, a pressure switch 210 in line 204 closes to cause an electrical signal to be sent to the electrically controlled valve 164 of the feeding circuit. This signal is effective to cause the valve 164 to raise the pressure in line 166 to workpiece "feeding" pressure which in the example is 2500 p.s.i. After the tubing has started to bulge and the main cylinder has fed the workpiece into the die the selected amount determined by the setting of the stop abutment 120 on the control slide, limit switch LS-5 closes and causes a signal to be sent to the electronic control of the pressure reducing valve 170. This second signal to the valve causes the pressure in the intensifier circuit to increase to a predetermined setting as for example 3000 p.s.i. This creates a pressure of approximately 56,000 p.s.i. in the workpiece and causes the material being formed to be "coined" fully into the die crevices.

When the high forming pressure has been reached, a pressure switch 211 in line 204 closes and causes a signal to be sent to the electronic control of valve 170. This signal from pressure switch 211 causes the valve 170 to reduce the pressure to the pre-set initial setting as for example 100 p.s.i. in a pre-set time as for example one-half second. The signal from pressure switch 211 is also sent to the control unit of pressure reducing valve 164 in the sealing and feeding circuit. Both valves begin reducing pressures to their initial settings at the same time; however the setting of the pressure reducing valve 170 is such that it reduces its pressure faster than the valve 164. In this manner the sealing mandrels 19 are prevented from being blown out of the workpiece. The sealing mandrels would be forced out of the workpiece if there was a high pressure in the intensifier circuit with a low pressure in the seal cylinder circuit.

To retract the intensifier piston 25 and the main pistons 8 and 17, solenoids 212 and 195 are energized through a time delay circuit by a signal from pressure switch 211 indicating the workpiece is fully "coined." Energization of solenoid 212 moves the valve 202 into a position in which oil is directed via lines 201 and 213 to the forward side of the intensifier piston so as to cause the piston to move back to its starting position. Oil leaving the rearward side of the intensifier piston passes through line 204, a check valve 214, valve 202 and line 215 to the tank 185. When the intensifier piston 25 is fully retracted, fluid pressure in line 213 increases to close a pressure switch 216 which de-energizes solenoid 212 and conditions the electrical circuit for another cycle after the formed workpiece is replaced by a blank tube. As was explained earlier, energization of solenoid 195 causes retraction of the main or feeding pistons 8 and 17. When the feed piston is fully retracted, return stop abutment 121 closes switch LS-3 to stop retraction of the piston and place the hydraulic and electrical circuits in a position to start the cycle again upon closing of the manual start switch (not shown).

Operation of the motor system and hydraulic control circuit should now be readily obvious. Summarizing, upon energization of a manual start switch (not shown), solenoid 163 is energized to move the valve 162 into a position in which fluid is pumped to the rearward side of the feeding cylinders 8 and 17. After the sealing and feeding pistons have moved forwardly at a fast feed rate into a position in which the sealing mandrels 9 and 19 are approximately ¼" from the workpiece, abutment 122 engages and closes switch LS-4 to energize the solenoid control valve (not shown) which supplies water to the workpiece through the water inlet port 41. Simultaneously, the feed speed is decreased and feeding pressure is increased. After the mandrels 9, 19 are seated against the workpiece, the intensifier piston is automatically started to move forward and continues until the water in the workpiece reaches "bulging" pressure. Thereafter the feeding pressure is automatically increased to force the workpiece into the die cavity. After the workpiece has been fed completely into the die, the infeed stop abutment 120 engages the limit switch LS-5 and causes the valve 170 to be moved into a "coining" pressure position in which the intensifier piston is moved forwardly at a very high pressure to force or coin the workpiece into all of the die crevices. Thereafter the fluid pressures within the feeding and pressure intensifying cylinders are returned to their starting levels and the pistons automatically retracted to their cycle start position. While a preferred embodiment of the invention has been illustrated and described herein, it should be understood that I do not intend to be limited to the details of the illustrated embodiment but only by the appended claims.

Having described my invention, I claim:

1. Mechanism for hydraulically forming a metal tube to a predetermined shape as defined by
    a mold cavity within which a tubular blank is adapted to be seated and supported and conforming to the shape to which said blank is to be formed,
    at least one hydraulic feeding and sealing motor, said motor including a piston movably mounted within a cylinder, said piston having a sealing mandrel mounted thereon and adapted to be moved into endwise sealed engagement with a portion of said blank seated in said mold,
    means for feeding hydraulic fluid through said mandrel into said blank, and
    a pressure intensifier operable to force entrapped fluid into said blank under a pressure at least equal to the yield point of said blank so as to force the blank into the contour of said mold cavity, said pressure intensifier including a hydraulic piston and cylinder, said intensifier cylinder being mounted within the piston of said feeding and sealing motor whereby movement of said feeding and sealing motor may be made without a resulting pressure change in said pressure intensifier.

2. A machine for hydraulically forming a metal tube to a predetermined shape as defined by a mold cavity within which a tubular blank is adapted to be seated and supported, said machine comprising,
    a base,
    at least one hydraulic feeding and sealing motor including a piston and cylinder mounted upon said base and having a sealing mandrel mounted upon said piston adapted to be moved into endwise engagement with a portion of said blank seated in said mold,
    means for feeding hydraulic fluid through said mandrel into said blank, and,
    a pressure intensifier motor operable to force fluid entrapped in said mandrel into said blank under a pressure at least equal to the yield point of said blank to force the blank into the contour of said mold cavity, said pressure intensifier including a piston and cylinder, said intensifier cylinder being mounted within the piston of said feeding and sealing motor whereby movement of said feeding and sealing motor may be made without a resulting pressure change in said intensifier.

3. A machine for hydraulically forming a metal tube to a predetermined shape, said machine comprising,
    a base,
    a mold mounted upon said base and adapted to receive and support a tubular metal blank,
    said mold defining a cavity external of a tubular blank seated in said mold and conforming to the shape to which said blank is to be formed,
    at least one hydraulic feeding and sealing motor including a piston and cylinder mounted upon said base and having a sealing mandrel mounted upon said piston adapted to be moved into endwise engagement with a portion of said blank seated in said mold,
    means for feeding hydraulic fluid through said mandrel into said blank, and,
    a pressure intensifier motor operable to force entrapped fluid into said blank under a pressure at least equal to the yield point of said blank so as to force said blank into the contour of said mold cavity, said pressure intensifier including a piston and cylinder, said intensifier cylinder being mounted within the piston of said feeding and sealing motor whereby movement of said feeding and sealing motor may be made without a resulting pressure change in said intensifier.

4. A machine for hydraulically forming a metal tube to a predetermined shape, said machine comprising,
    a base,
    a mold mounted upon the base and adapted to receive and support a tubular metal blank,
    said mold defining a cavity external of a tubular blank seated in said mold and conforming to the shape to which said blank is to be formed,
    at least one hydraulic feeding and sealing motor having a cylinder mounted upon said base,
    a feed piston mounted within said cylinder and including a piston rod connected thereto and extending through the forward wall of said cylinder,
    a port member connected to said piston and extending through the rear wall of said cylinder,
    a sealing mandrel mounted on the end of said piston rod adapted to be moved into endwise engagement with said blank seated in said mold,
    means for feeding hydraulic fluid through said mandrel into said blank,
    a pressure intensifier piston mounted within a cylinder in said feed piston rod and having an intensifier piston rod operable to force entrapped fluid through said mandrel into said blank under a pressure at least equal to the yield point of said blank to force the blank into the contour of said mold cavity, and
    fluid conduit means for feeding fluid through said port member and feed piston into said intensifier cylinder to move said intensifier piston forwardly.

5. A hydraulic motor system comprising,
    a first hydraulic motor including a cylinder,
    a first piston mounted within said cylinder and having a piston rod extending through an end wall of said cylinder,
    said first piston defining an axially extending hydraulic motor chamber,
    an aperture extending between said chamber and one end of said first piston rod,
    a pressure intensifier piston within said chamber having a pressure intensifier piston rod extending into said aperture, and port means for feeding hydraulic fluid into said aperture at a point between the end of said intensifier piston rod and said one end of said first piston rod when said intensifier piston is in its retracted position, said port means being covered by said intensifier piston rod in its forward position whereby entrapped fluid is forced from said end of said main piston rod when said pressure intensifier piston is moved into into its forward position.

6. A machine for hydraulically forming a metal tube to a predetermined shape as defined by a mold cavity within which a tubular blank is adapted to be seated and supported, said machine comprising, a base, at least one hydraulic feeding and sealing motor having a cylinder fixedly mounted upon said base, a feed piston mounted within said cylinder and including a piston rod connected thereto and extending through an end wall of said cylinder, a sealing mandrel mounted on the end of said piston rod adapted to be moved into endwise engagement with said blank seated in said mold, means for feeding hydraulic fluid through said mandrel into said blank, and, a pressure intensifier motor including a piston and cylinder, said motor being mounted so as to be movable with said feed piston and having a piston rod operable to force entrapped fluid through said mandrel, said mounting of said pressure intensifier permitting movement of said feeding and sealing motor without a resulting pressure change in said intensifier.

7. A machine for hydraulically forming a metal tube to a predetermined shape as defined by a mold cavity within which a tubular blank is adapted to be seated and supported, said machine comprising, a base, at least one hydraulic feeding and sealing motor having a cylinder fixedly mounted upon said base, a feed piston mounted with said cylinder and including a piston rod connected thereto and extending through an end wall of said cylinder, a sealing mandrel mounted on the end of said piston rod adapted to be moved into endwise engagement with said blank seated in said mold, means including a port through said feed piston for feeding hydraulic fluid through said mandrel into said blank, and, a pressure intensifier piston and cylinder supported from said feed piston and mounted so as to be movable with said feed piston, said pressure intensifier piston having a pressure intensifier piston rod operable to force entrapped fluid through said mandrel, said mounting of said pressure intensifier permitting movement of said feeding and sealing motor without a resulting pressure change in said pressure intensifier, and said intensifier piston rod in its retracted position being behind said port and in its forward position covering said port so that fluid is entrapped in said piston and mandrel upon forward movement of said intensifier piston rod over said port.

References Cited by the Examiner
UNITED STATES PATENTS

| | | | |
|---|---|---|---|
| 1,812,816 | 6/1931 | Weaver | 60—54.6 |
| 1,930,155 | 10/1933 | Wiedmann | 60—54.5 |
| 2,713,314 | 7/1955 | Leuthesser et al. | 113—44 |

CHARLES W. LANHAM, *Primary Examiner.*